United States Patent
Moon

(10) Patent No.: US 10,339,210 B2
(45) Date of Patent: Jul. 2, 2019

(54) METHODS, DEVICES AND COMPUTER-READABLE MEDIUMS PROVIDING CHAT SERVICE

(71) Applicant: LINE Corporation, Tokyo (JP)

(72) Inventor: Young Min Moon, Seongnam-si (KR)

(73) Assignee: LINE Corporation, Tokyo (JP)

( * ) Notice: Subject to any disclaimer, the term of this patent is extended or adjusted under 35 U.S.C. 154(b) by 438 days.

(21) Appl. No.: 14/825,444

(22) Filed: Aug. 13, 2015

(65) Prior Publication Data

US 2016/0188555 A1    Jun. 30, 2016

(30) Foreign Application Priority Data

Dec. 31, 2014 (KR) .................. 10-2014-0195297

(51) Int. Cl.
| | | |
|---|---|---|
| G06F 3/00 | (2006.01) | |
| G06F 17/24 | (2006.01) | |
| G06F 3/0488 | (2013.01) | |
| G06F 3/0486 | (2013.01) | |
| H04L 12/58 | (2006.01) | |

(52) U.S. Cl.
CPC .......... *G06F 17/24* (2013.01); *G06F 3/0486* (2013.01); *G06F 3/04883* (2013.01); *H04L 51/043* (2013.01); *H04L 51/16* (2013.01); *H04L 51/04* (2013.01); *H04L 51/22* (2013.01)

(58) Field of Classification Search
None
See application file for complete search history.

(56) References Cited

U.S. PATENT DOCUMENTS

2007/0185993 A1 *  8/2007  McArdle ............... G06Q 10/10
                                                              709/225
2008/0055269 A1 *  3/2008  Lemay .................. G06F 3/0482
                                                              345/173

(Continued)

FOREIGN PATENT DOCUMENTS

| KR | 2013-0097551 A | 9/2013 |
| KR | 2014-0020112 A | 2/2014 |
| KR | 2014-0086362 A | 7/2014 |

OTHER PUBLICATIONS

Anonymous, System and Method for Automatic Creation of smart Phone Events from Conversations, Jan. 12, 2011, IEEE, pp. 1-3 (Year: 2011).*

(Continued)

*Primary Examiner* — Tam T Tran
(74) *Attorney, Agent, or Firm* — Harness, Dickey & Pierce, P.L.C.

(57) ABSTRACT

A method of providing a chat service includes: sequentially displaying, on a display unit of a first device, a plurality of visual signs according to at least one of transmission and reception times of the plurality of visual signs, the plurality of visual signs being included in a conversation between the first device and one or more second devices, and being transmitted between the first device and the one or more second devices; receiving an edit mode entry command to enter an edit mode in which the plurality of visual signs are editable; receiving a visual sign selection command selecting one or more of the plurality of visual signs; and changing a display order of the plurality of visual signs by moving the selected one or more of the plurality of visual signs.

17 Claims, 19 Drawing Sheets

(56) References Cited

U.S. PATENT DOCUMENTS

| | | | |
|---|---|---|---|
| 2011/0083105 A1* | 4/2011 | Shin | G06F 3/0482 715/830 |
| 2013/0227705 A1 | 8/2013 | Yoon et al. | |
| 2014/0047358 A1* | 2/2014 | Park | H04M 1/72552 715/758 |
| 2014/0184544 A1* | 7/2014 | Lim | H04L 51/066 345/173 |
| 2015/0006653 A1* | 1/2015 | Shin | H04L 65/403 709/206 |
| 2016/0004397 A1* | 1/2016 | Kim | G06F 15/0291 715/203 |
| 2016/0026367 A1* | 1/2016 | Brown | G06F 3/04817 715/835 |
| 2016/0180167 A1* | 6/2016 | Watts-Englert | G06F 3/0486 715/748 |

OTHER PUBLICATIONS

G. Di Fabbrizio et al., Unifying conversational multimedia interfaces for accessing network services across communication devices, Jan. 1, 2000, IEEE, pp. 653-656 (Year: 2000).*
Korean Office Action dated Feb. 29, 2016, issued in Korean patent application No. 10-2014-0195297.
<URL: http://sounghwa777.blog.me/30104987268>, Mar. 19, 2011, 13 pages.

* cited by examiner

METHODS, DEVICES AND COMPUTER-READABLE MEDIUMS PROVIDING CHAT SERVICE

CROSS-REFERENCE TO RELATED APPLICATION

This application claims priority under 35 U.S.C. § 119 to Korean Patent Application No. 10-2014-0195297, filed on Dec. 31, 2014, in the Korean Intellectual Property Office, the entire contents of which is incorporated herein by reference.

BACKGROUND

Field

One or more example embodiments relate to methods, apparatuses and/or computer-readable mediums for providing chat services.

Description of the Related Art

As electronic communication technology has advanced, users have become able to perform various functions using devices capable of performing electronic communication. The term "device" refers to a personal computer (PC) or a portable terminal. Such devices are widely available and many users are quite familiar with installing various programs thereon, deleting programs therefrom, and directly accessing communication networks via wireless Internet.

Such devices are capable of transmitting and receiving data therebetween via communication networks. Accordingly, chat services through multilateral visual signs have been actively developed and used. These chat services enable devices to transmit and receive visual signs between the devices, and display the visual signs on the devices.

SUMMARY

One or more example embodiments provide methods, devices and/or non-transitory computer-readable storage mediums for providing a chat service, which are capable of editing content of conversations by editing the order of visual signs displayed during multilateral conversations through the visual signs or deleting some of the visual signs, and are capable of editing content of conversations according to the importance thereof.

One or more example embodiments provide methods, devices and/or non-transitory computer-readable storage mediums for providing a chat service, which are capable of notifying edited content of conversations to other persons by transmitting and receiving information on edited visual signs among a plurality of devices.

Additional aspects will be set forth in part in the description which follows and, in part, will be apparent from the description, or may be learned by practice of the presented embodiments.

At least one example embodiment provides a method of providing a chat service, the method comprising: sequentially displaying, on a display unit of a first device, a plurality of visual signs according to at least one of transmission and reception times of the plurality of visual signs, the plurality of visual signs being included in a conversation between the first device and one or more second devices, and being transmitted between the first device and the one or more second devices; receiving an edit mode entry command to enter an edit mode in which the plurality of visual signs are editable; receiving a visual sign selection command selecting one or more of the plurality of visual signs; and changing a display order of the plurality of visual signs by moving the selected one or more of the plurality of visual signs.

At least one other example embodiment provides a non-transitory computer-readable recording medium having recorded thereon a program that, when executed by a computer, causes the computer to perform a method of providing a chat service, the method comprising: sequentially displaying, on a display unit of a first device, a plurality of visual signs according to at least one of transmission and reception times of the plurality of visual signs, the plurality of visual signs being included in a conversation between the first device and one or more second devices, and being transmitted between the first device and the one or more second devices; receiving an edit mode entry command to enter an edit mode in which the plurality of visual signs are editable; receiving a visual sign selection command selecting one or more of the plurality of visual signs; and changing a display order of the plurality of visual signs by moving the selected one or more of the plurality of visual signs.

At least one other example embodiment provides a device for providing a chat service, the device comprising: a memory having computer-readable instructions stored therein; and at least one processor. The at least one processor is configured to execute the computer-readable instructions to: transmit and receive a plurality of visual signs to and from one or more external devices; display the plurality of visual signs; receive an edit mode entry command to enter an edit mode in which the plurality of visual signs are editable; receive a visual sign selection command selecting one or more of the plurality of visual signs; sequentially display the plurality of visual signs according to at least one of transmission and reception times of the plurality of visual signs; and change a display order of the plurality of visual signs by moving the selected one or more of the plurality of visual signs.

According to at least some example embodiments, the display unit may a touch sensitive display unit; and the receiving the visual sign selection command may include detecting at least one of (i) a touch input at a position on the display unit corresponding to the one or more of the plurality of visual signs, and (ii) a dragging of the position corresponding to the one or more of the plurality of visual signs while holding the touch input.

The selected one or more visual signs may be moved to a position at which the touch input on the display unit is completed.

The selected one or more of the plurality of visual signs may be displayed discriminatively from others of the plurality of visual signs based on the received visual sign selection command.

The moved one or more of the plurality of visual signs may be displayed discriminatively from others of the plurality of visual signs.

An end command to end the edit mode may be received after the receiving of the visual sign selection command.

The selected one or more of the plurality of visual signs may be moved to a position at which a most recently transmitted or received visual sign, from among the plurality of the visual signs, is displayed on the display unit in response to receiving the end command.

The moved one or more visual signs may be fixed to a position.

The selected one or more visual signs may be moved in a first direction; and from among the plurality of visual signs, those visual signs located between an original position of the moved one or more of the plurality of visual signs and a moved position of the moved one or more of the plurality of visual signs may be moved in a second direction opposite to the first direction.

The displayed content of the plurality of visual signs may be changed by deleting the selected one or more of the plurality of visual signs.

After the changing, edit information indicating the movement of the selected one or more of the plurality of visual signs may be transmitted to the one or more second devices. The edit information may be transmitted only to one or more second devices selected by a user of the first device from among the one or more second devices. The edit information may be transmitted only to one or more second devices, from among the one or more second devices, which have transmitted at least one of the selected one or more of the plurality of visual signs.

Information indicating that the display order of the plurality of visual signs has been changed at the one or more second devices may be received from the one or more second devices; and the display order of the plurality of visual signs may be changed based on the received information. The display order of the plurality of visual signs may be changed based on the received information only when the received information is information received from a second device, which is among the one or more second devices, and which has been selected by a user of the first device.

A notification may be output on the display unit when the display order of the plurality of visual signs is changed based on the received information.

The changed display order of the plurality of visual signs may be reset by rearranging the plurality of visual signs according to at least one of the transmission and reception times of the plurality of visual signs.

After the changing, edited content of conversations may be stored in an electronic file.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
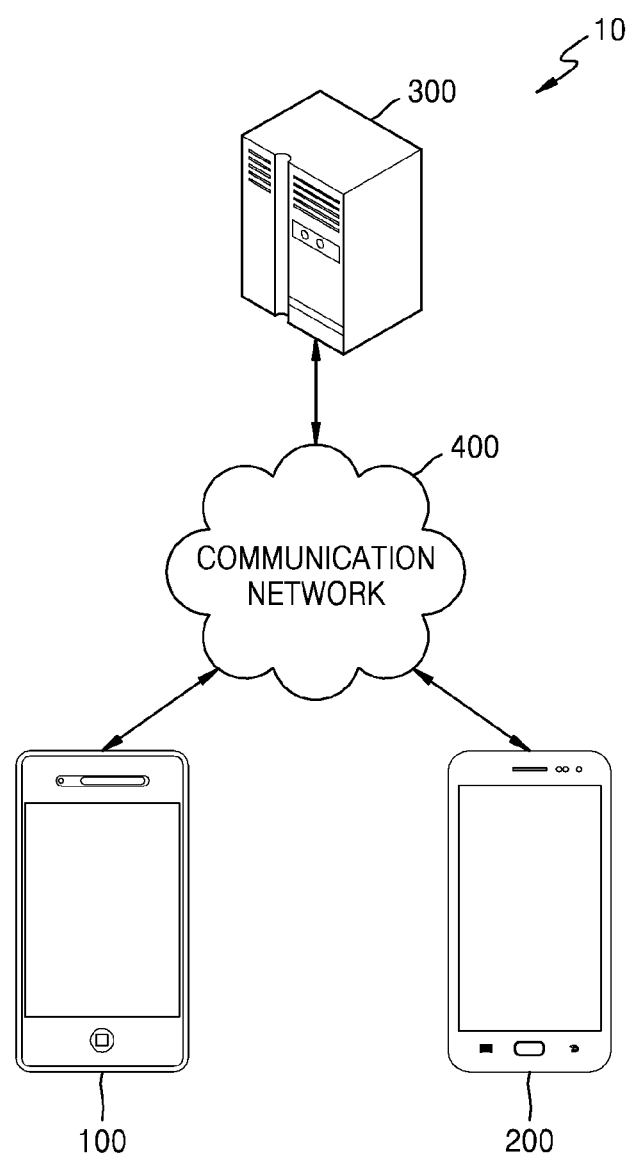
FIG. 1 is a diagram illustrating a configuration of a system for providing a chat service according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, some example embodiments are described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Example embodiments will be described in detail with reference to the accompanying drawings. Inventive concepts, however, may be embodied in various different forms, and should not be construed as being limited only to the illustrated example embodiments. Rather, these embodiments are provided as examples so that this disclosure will be thorough and complete, and will fully convey inventive concepts to those skilled in the art. Accordingly, known processes, elements, and techniques are not described with respect to some of the example embodiments of inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular example embodiments only and is not intended to be limiting of inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

In the description below, it will be understood that when an element such as a layer, region, substrate, plate, or member is referred to as being "on" another element, it can be directly on the other element or intervening elements may be present. In contrast, the term "directly" means that there are no intervening elements.

Example embodiments disclosed herein may comprise program code including program instructions, software components, software modules, data files, data structures, and/or the like that are implemented by one or more physical hardware devices. Examples of program code include both machine code produced by a compiler and higher level program code that is executed using an interpreter. The hardware devices may include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

Alternatively, or in addition to the processors discussed above, the hardware devices may include one or more Central Processing Units (CPUs), digital signal processors (DSPs), application-specific-integrated-circuits (ASICs), SoCs, field programmable gate arrays (FPGAs), or the like. In at least some cases, the one or more CPUs, SoCs, DSPs, ASICs and FPGAs, may generally be referred to as processing circuits and/or microprocessors.

The hardware devices may also include one or more storage devices. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the example embodiments described herein. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

It will be apparent to those skilled in the art that various modifications and variations can be made to the example embodiments without departing from the spirit or scope of the inventive concepts described herein. Thus, it is intended that the example embodiments cover the modifications and variations of the example embodiments provided they come within the scope of the appended claims and their equivalents.

Hereinafter, example embodiments will be described in detail with reference to the accompanying drawings. In this regard, the same or corresponding elements will be denoted by the same reference numerals and will not be redundantly described herein.

FIG. 1 is a diagram illustrating a configuration of a system 10 for providing a chat service, according to an example embodiment.

Referring to FIG. 1, the system 10 for providing a chat service, according to the example embodiment, may include a first device 100 and a second device 200. In addition, the system 10 for providing a chat service may further include a communication network 400 configured to connect the first device 100 and the second device 200 to each other. In addition, the system 10 for providing a chat service may further include a server 300 configured to be connected to the first device 100 or the second device 200 via the communication network 400.

The first device 100 may be a device for providing a chat service in the system 10. The second device 200 also may be a device for providing a chat service in the system 10. The first device 100 may refer to a communication terminal that is capable of transmitting and receiving data with other devices in a wired and/or wireless communication environment. The second device 200 may also refer to a communication terminal that is capable of transmitting and receiving data with other devices in a wired and/or wireless communication environment. In FIG. 1, the first device 100 and the second device 200 are illustrated as smart phones, but inventive concepts should not be limited thereto. Any devices may be used as the first device 100 and the second device 200 as long as the devices are capable of transmitting and receiving data with other devices in the wired and/or wireless communication environment as described above.

More specifically, the first device 100 and the second device 200 may be, for example, smart phones, PCs, tablet PCs, smart TVs, mobile phones, personal digital assistants (PDAs), laptop computers, media players, micro servers, global positioning system (GPS) devices, e-book terminals, digital broadcasting terminals, navigations, kiosk, MP3 players, digital cameras, wearable devices, and other mobile or non-mobile computing devices, but inventive concepts should not be limited thereto.

In addition, the first device 100 and the second device 200 may include various devices, such as electronic bulletin boards and/or touch screens, which are capable of receiving touch input. Furthermore, the first device 100 and the second device 200 may be accessories, such as a watch, glasses, a hair band, and a ring, which have a communication function and a data processing function, but inventive concepts should not be limited thereto.

The first device 100 may perform a conversation with the second device 200 through visual signs. Although only one second device 200 is illustrated in FIG. 1, the first device 100 may perform a conversation (or converse) with a plurality of second devices 200 through visual signs. That is, for example, the first device 100 may transmit and receive the visual signs with the second devices 200, and the first device 100 may display the visual signs indicating the conversation between users on a display unit thereof. In addition, the second devices 200 may display the visual signs indicating the conversation between users on display units thereof.

In the present specification, the visual signs may be visually recognized just like alphabets, pictures, and photographs and may refer to objects, which are capable of transmitting information to a called party in a visual form, or a set of the objects. For example, the visual signs may include text messages, pictures, photographs, sentences generated by combinations thereof, or emoticons, which are displayable on the display unit of the first device 100, but inventive concepts should not be limited thereto.

The server 300 may be a server configured to provide a chat service. Although only one server 300 is illustrated in FIG. 1, a plurality of servers may be present according to traffic and/or data quantity.

Besides the chat service, the server 300 may provide a general search service and various services for improving other user experience and/or convenience. That is, for example, besides the chat service, the server 300 may provide various services, such as a search service, an email service, a blogging service, a social network service, a news service, a shopping information providing service, etc.

Alternatively, the server 300 may be a server that is connected to a server that provides a portal service, such as a search service, an email service, a news service, and a shopping service, and provides a webpage, which is provided by the portal service, to the first device 100 that requests the portal service to provide information. The server 300 and the portal service providing server may be separate servers that are physically separated from each other, or may be the same server that is divided conceptually.

The server 300 may store the content of the conversations between the first device 100 and the second device 200. In FIG. 1, the first device 100 is illustrated as directly transmitting and receiving data with the second device 200 via the communication network 400, but the data transmission and reception between the first device 100 and the second device 200 may be performed through the server 300. That is, for example, the visual signs, which are transmitted from the first device 100 in the form of electronic signals, may be transmitted to the server 300 via the communication network 400, and then, the server 300 may transmit the corresponding visual signs to the second device 200 via the communication network 400.

The communication network 400 may be configured to connect the first device 100 and the second device 200 to each other. In addition, the communication network 400 may be configured to connect the first device 100 and the second device 200 to the server 300. That is, for example, the communication network 400 may refer to a communication network configured to provide a connection path that allows data, including the visual signs, to be transmitted and received between the first device 100 and the second device 200. Examples of the communication network 400 may include a wired network, such as local area networks (LANs), wide area networks (WANs), metropolitan area networks (MANs), or integrated service digital networks (ISDNs), and a wireless network, such as wireless LANs, code division multiple access (CDMA) networks, Bluetooth, satellite communications networks, etc. However, inventive concepts should not be limited to these examples.

Figure 2:
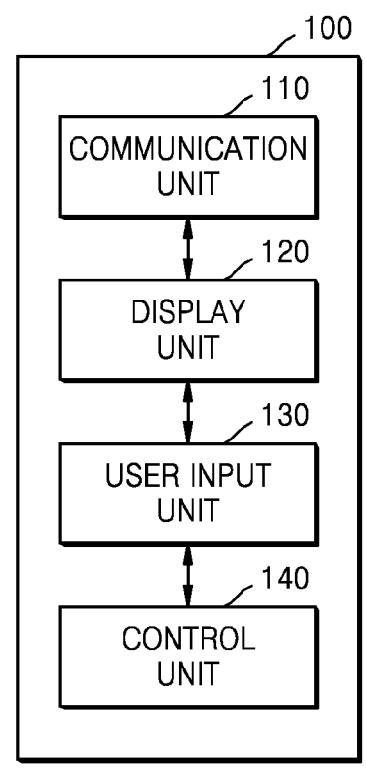
FIG. 2 is a block diagram illustrating an internal configuration of a device for providing a chat service in the system for providing a chat service in FIG. 1.

FIG. 2 is a block diagram illustrating an example internal configuration of the device for providing a chat service in the system 10 shown in FIG. 1.

Referring to FIG. 2, the first device 100, which is the device for providing a chat service in the system 10, may include a communication unit 110, a display unit 120, a user input unit 130, and a control unit 140.

The communication unit 110 may perform wired and/or wireless communication with at least one of the second devices 200 and the server 300. The communication unit 110 may be a Bluetooth communication unit, a Bluetooth low energy (BLE) communication unit, a near field communication (NFC) unit, a wireless local access network (WLAN) (Wi-Fi) communication unit, a Zigbee communication unit, an infrared data association (IrDA) communication unit, a Wi-Fi direction (WFD) communication unit, an ultra wideband (UWB) communication unit, or an Ant+ communication unit, but inventive concepts should not be limited thereto.

The communication unit 110 may transmit and receive a wireless signal with at least one of a base station, the second devices 200, and the server 300 on the communication network 400. The wireless signal may include various types of data, including the visual signs. That is, for example, the communication unit 110 may transmit the visual signs to the second device 200 and receive the visual signs from the second device 200.

The display unit 120 may display information processed by the first device 100. The display unit 120 may display the visual signs transmitted and received between the first device 100 and the second device 200. For example, the display unit 120 may display a chat window containing the content of conversations between a user of the first device 100 and users of the second devices 200, and may display the visual signs transmitted and received in the corresponding chat window.

The display unit 120 may include at least one selected from a liquid crystal display (LCD), a thin-film transistor-liquid crystal display (TFT-LCD), an organic light-emitting diode (OLED), a flexible display, a three-dimensional (3D) display, and an electrophoretic display, but inventive concepts should not be limited thereto. According to the implementation type of the first device 100, the first device 100 may include two or more display units 120.

The user input unit 130 may refer to a unit configured to allow the user to input data so as to control the first device 100. For example, the user input unit 130 may include a key pad, a dome switch, a touch pad (e.g., a touch-type capacitive touch pad, a pressure-type resistive touch pad, an infrared beam sensing type touch pad, a surface acoustic wave type touch pad, an integral strain gauge type touch pad, a piezo effect type touch pad, etc.), a jog wheel, and a jog switch, but inventive concepts should not be limited thereto.

The user input unit 130 may receive the user input for the chat service through the visual signs. For example, the user input unit 130 may receive a user's voice input, a user's text input, or a user's touch input, but inventive concepts should not be limited thereto.

The user input unit 130 may form a layer structure with the display unit 120 to thereby constitute a single touch screen. In this case, the display unit 120 and the user input unit 130 may form a single physical configuration.

The control unit 140 may control the overall operation of the first device 100. For example, the control unit 140 may control the overall operations of the communication unit 110, the display unit 120, and the user input unit 130 by executing programs stored in a memory of the first device 100. In order to perform the operations of the first device 100 as illustrated in FIGS. 1 to 8C, the control unit 140 may control the overall operations of the communication unit 110, the display unit 120, and the user input unit 130.

Specifically, the control unit 140 may display the visual signs received through the communication unit 110 or the visual signs input through the user input unit 130 on the display unit 120. In addition, the control unit 140 may sequentially display the corresponding visual signs according to the order of creation of the corresponding visual signs or the transmission and reception times of the corresponding visual signs. In this case, the control unit 140 may display the corresponding visual signs on the display unit 120, such that the corresponding visual signs are sequentially arranged in a first direction. For example, in a case where the first direction is a downward direction, the control unit 140 may display an earlier transmitted or received visual sign at a first position of the display unit 120 and display a later transmitted or received visual sign at a second position under the first position of the display unit 120.

In addition, the control unit 140 may activate an edit mode that allows the user to edit the visual signs displayed on the display unit 120. The control unit 140 may activate the edit mode when an edit mode entry command is input through the user input unit 130. The edit mode entry command may be various types of inputs that the user of the first device 100 is allowed to input to the first device 100 through the user input unit 130. More specifically, for example, the user input unit 130 may detect a click or a touch action on a user interface (UI) that is present at a specific position of the display unit 120. In this case, the control unit 140 may determine whether the detected action corresponds to the edit mode entry command. When it is determined that the detected action corresponds to the edit mode entry command, the control unit 140 may activate the edit mode. As such, the edit mode entry command may be a click, a double click, a drag, or an air gesture on the UI that is present at the specific position of the display unit 120, but inventive concepts should not be limited thereto. In a case where the display unit 120 is a touch sensitive display unit, the edit mode entry command may be a short tap, a long tap, a double tap, or a touch-and-drag in a specific direction on the UI that is present at the specific position of the display unit 120, but inventive concepts should not be limited thereto.

In addition, the control unit 140 may select one or more of the visual signs displayed on the display unit 120 in a state in which the edit mode is activated. The control unit 140 may select the corresponding visual signs when a visual sign selection command is input through the user input unit 130. The visual sign selection command may be various types of inputs that the user of the first device 100 is allowed to input to the first device 100 through the user input unit 130. For example, the visual sign selection command may be a click, a double click, or a drag at positions corresponding to the visual signs on the display unit 120, but inventive concepts should not be limited thereto. In a case where the display unit 120 is a touch sensitive display unit, the visual sign selection command may be a short tap, a long tap, a double tap, or a touch-and-drag in a specific direction, or an air gesture at the positions corresponding to the visual signs on the display unit 120, but inventive concepts should not be limited thereto.

The positions corresponding to the visual signs may be positions themselves where the corresponding visual signs are displayed, or positions where a UI representing a specific visual sign is displayed. Specifically, in the edit mode, UIs such as checkboxes may be displayed beside, above, or under the visual signs. A position at which a corresponding UI such as a checkbox is displayed may be a position corresponding to a specific visual sign. The user input unit 130 may detect a click or a touch action on the corresponding UI such as the checkbox. The control unit 140 may determine the detected action as an action of selecting a specific visual sign.

In addition, the control unit 140 may determine the visual sign selection command as a selection command and (e.g., concurrently and/or simultaneously) as an edit mode entry command. For example, in a case where a command of selecting positions corresponding to visual signs on the display unit 120 is input in a non-edit mode, the control unit 140 may select the corresponding visual signs while activating the edit mode.

In addition, the control unit 140 may edit the display order of the visual signs by moving the selected visual signs to a given (or, alternatively, desired or predetermined) position on the display unit 120. The position may be various types of inputs that represent the specific position on the display unit 120. For example, in a case where the user selects a UI indicating the completion of the edit on the display unit 120, the control unit 140 may move the selected visual signs to a position at which the most recently received visual sign is displayed on the display unit 120. As another example, in a case where the user selects a specific visual sign by a click or touch, drags the selected visual sign while holding the corresponding click or touch, and ends the corresponding click or touch, the control unit 140 may move the corresponding visual sign to a position at which the corresponding dragging is completed.

In addition, the control unit 140 may delete the selected visual signs on the display unit 120. For example, in a case where the user selects a UI indicating a deletion on the display unit 120, the control unit 140 may delete the selected visual signs on the display unit 120. As another example, in a case where the user selects a specific visual sign by a click or touch, drags the selected visual sign to a UI indicting a deletion or an edge of the display unit 120 while holding the corresponding click or touch, and ends the corresponding click or touch, the control unit 140 may delete the selected visual sign.

In addition, the control unit 140 may reset the edited content of the visual signs so as to return to a state in which the visual signs are sequentially displayed according to at least one of the transmission and reception times of the visual signs. For example, in a case where the user inputs a command of resetting the edited content, the control unit 140 may restore the display order of the visual signs to a state prior to the edit of the order and return to a state of displaying the deleted content of conversations again.

Figure 3:
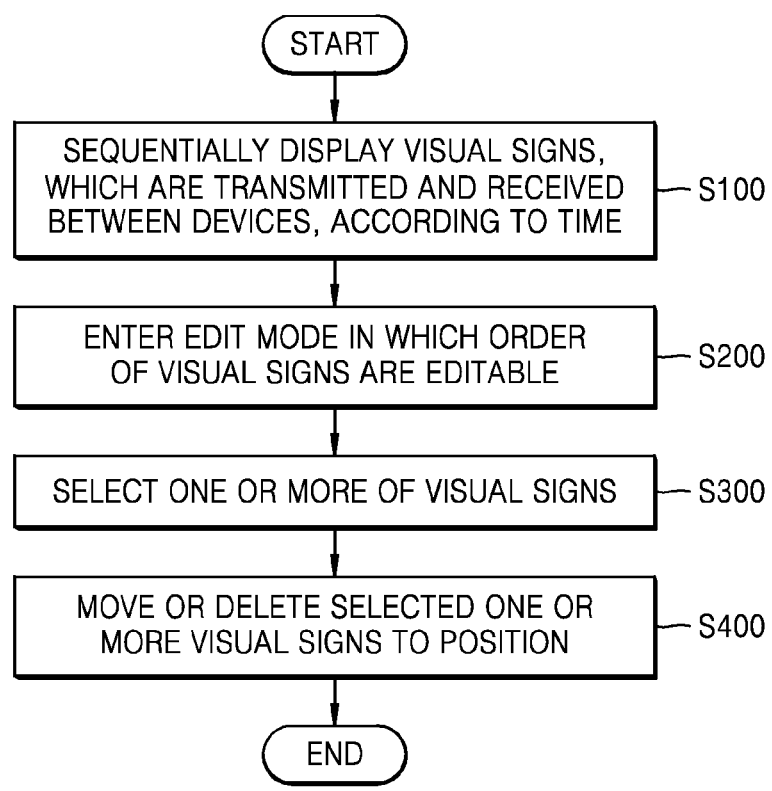
FIG. 3 is a flowchart of a method of providing a chat, according to an example embodiment.

FIG. 3 is a flowchart of a method of providing a chat service, according to an example embodiment.

The flowchart of FIG. 3 may include operations processed in time series by the first device 100 that is the device for providing a chat service in FIG. 2. Therefore, even though omitted below, the descriptions provided with reference to the configuration of FIG. 2 may be applied to the flowchart of FIG. 3.

Referring to FIG. 3, the method of providing a chat service, according to the example embodiment, may include: operation S100 of sequentially displaying a plurality of visual signs, which are transmitted and received between devices, according to a time; operation S200 of entering an edit mode that allows a user to edit the plurality of visual signs; operation S300 of selecting one or more of the plurality of visual signs; and operation S400 of moving the selected one or more visual signs to a given (or, alternatively, desired or predetermined) position or deleting the selected one or more visual signs. Operation S200 of entering the edit mode and operation S300 of selecting the one or more visual signs may be merged into one operation. That is, for example, when the user selects one or more visual signs, the edit mode may be activated while the corresponding visual signs are selected. In addition, operation S300 of selecting the one or more visual signs and operation S400 of moving or deleting the selected one or more visual signs may be merged into one operation. That is, for example, when the user selects one or more visual signs in the edit mode, the corresponding visual signs may be moved to the given (or, alternatively, desired or predetermined) position or be deleted while the corresponding visual signs are selected.

FIGS. 4A to 8C are diagrams for describing an example process of providing a chat service on a device according to the method of FIG. 3.

Referring to FIG. 4, the method of providing a chat service, according to an example embodiment, may sequentially display visual signs indicating the content of multilateral conversations according to the input times or the transmission and reception times of the corresponding visual signs. In this case, the visual signs indicating the content of multilateral conversations may be sequentially displayed on the display unit of the first device 100. In addition, visual signs, which are directly created through the first device 100, may be displayed while being aligned at a first side of the display unit of the first device 100. Visual signs, which are received from the second devices 200, may be classified according to the second devices 200 having transmitted the content of conversations and be displayed while being aligned at a second side opposite to the first side of the display unit. In this case, the second devices 200 may be classified through UIs that indicate different texts, pictures, photographs, etc.

Figure 4A:
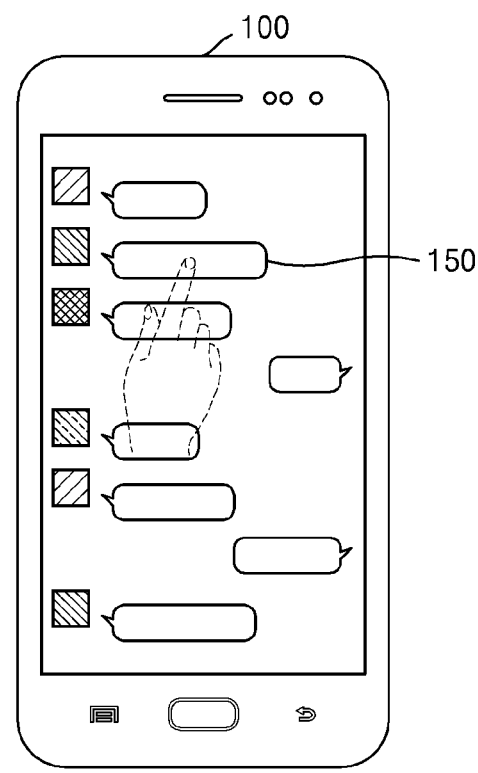
FIGS. 4A to 8C are diagrams for describing a process of providing a chat service on a device according to the method of FIG. 3.
Figure 4B:
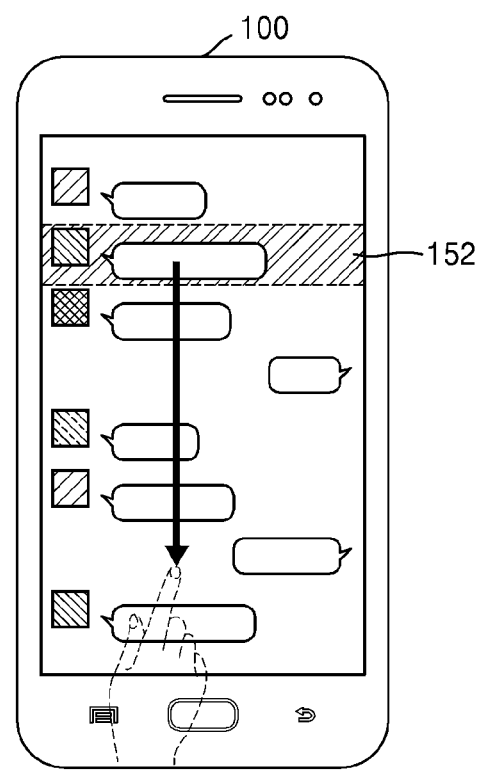

At this time, the first device 100 may receive a user input of selecting one of the visual signs. For example, as illustrated in FIG. 4A, the first device 100 may detect a touch on a position 150 where a visual sign that the user wants to select is displayed. When the user input of selecting one visual sign is received, the first device 100 may display the corresponding visual sign discriminatively from other visual signs. For example, as illustrated in FIG. 4B, the first device 100 may display a background color of a region 152, in which the selected visual sign is located, differently from background colors of regions, in which other visual signs are located.

Figure 4C:
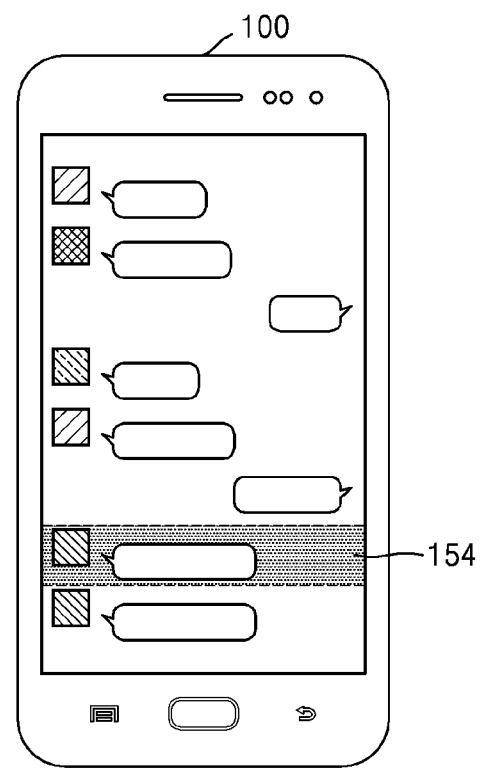

At this time, the first device 100 may receive a user input of moving the selected visual sign to a specific position. For example, as illustrated in FIG. 4B, the first device 100 may detect a user action of touching and dragging a visual sign. When a user input of moving a selected visual sign is received, the first device 100 may move the corresponding visual sign to a given (or, alternatively, desired or predetermined) position. For example, as illustrated in FIG. 4C, the first device 100 may edit the display order of the visual signs by moving the selected visual sign to a position at which the dragging has been completed. In this manner, the user may arbitrarily edit the order of the conversations in the chat window. At this time, the moved visual sign may be displayed discriminatively from other visual signs. For example, as illustrated in FIG. 4C, the first device 100 may display a background color of a region 154, in which the moved visual sign is located, differently from background colors of regions, in which other visual signs are located. In this manner, the user may more easily confirm which visual sign has been edited in the display order.

In addition, the first device 100 may receive a user input of deleting the selected visual sign. For example, in a case where the user touches a UI indicating a deletion, the first device 100 may not display the selected visual sign by deleting the selected visual sign. In this manner, the user may delete conversation that the user does not want to display among the content of conversations in the chat window.

Figure 5A:
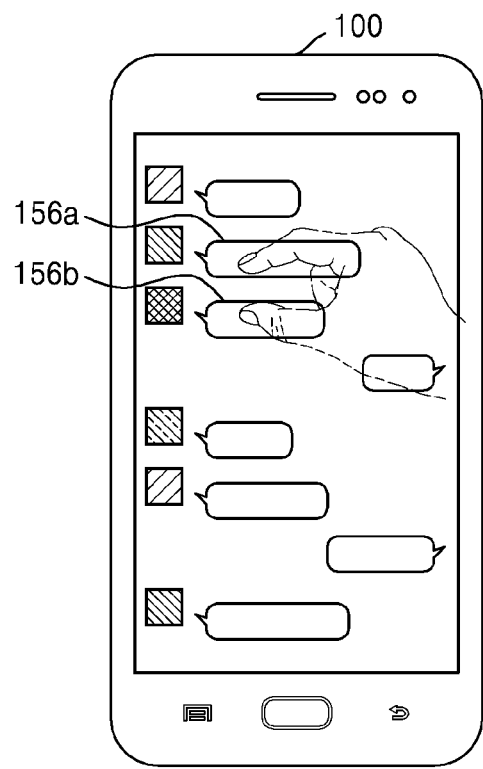
Figure 5B:
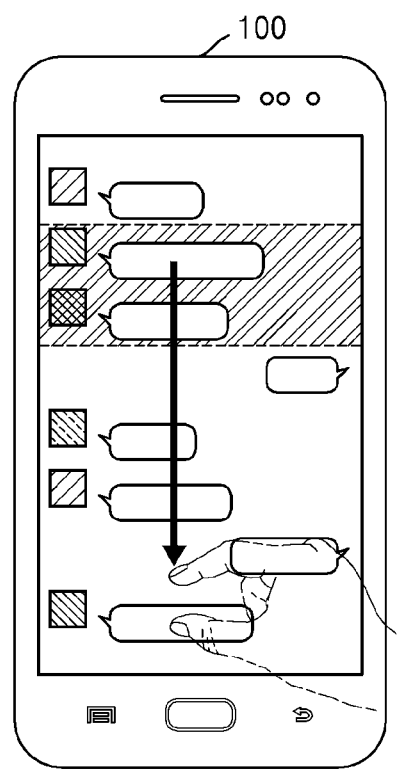
Figure 5C:
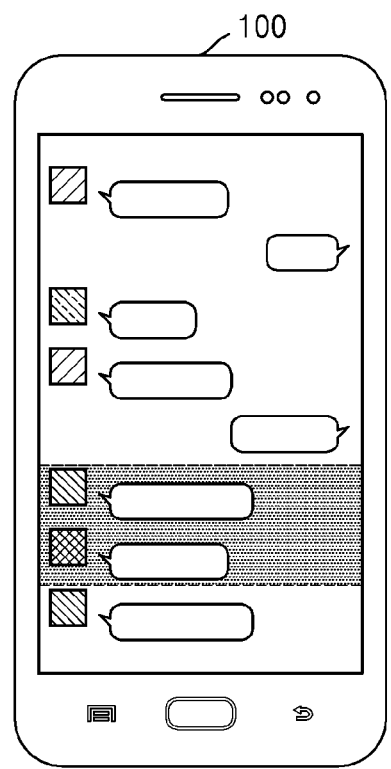

The first device 100 may receive a user input of selecting at least some of a plurality of visual signs. For example, as illustrated in FIG. 5A, the first device 100 may detect a multi-touch on positions where visual signs 156a and 156b that the user wants to select are displayed. At this time, the first device 100 may receive a user input of moving the selected visual signs to specific positions. For example, as illustrated in FIG. 5B, the first device 100 may detect a user action of touching and dragging specific visual signs. When a user input of moving the selected visual signs is received, the first device 100 may move the corresponding visual signs to given (or, alternatively, desired or predetermined) positions. For example, as illustrated in FIG. 5C, the first device 100 may edit the display order of the visual signs by moving the selected visual signs to positions at which the dragging has been completed. In this manner, the user may edit the order of the conversations in the chat window at once.

In FIG. 5, the multi-touch is illustrated as an example embodiment of a method of selecting some visual signs, but inventive concepts should not be limited thereto. That is, for example, methods of recognizing the command of selecting at least some of the plurality of visual signs in the first device 100 may include a method of sequentially clicking or touching some of positions corresponding to visual signs in an edit mode, and a method of clicking or touching the first visual sign and then clicking or touching the last visual sign among the visual signs that the user wants to select.

Figure 6A:
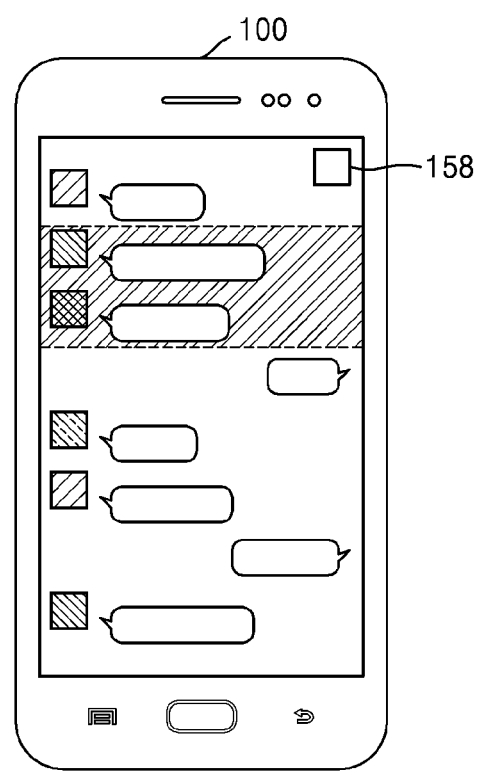
Figure 6B:
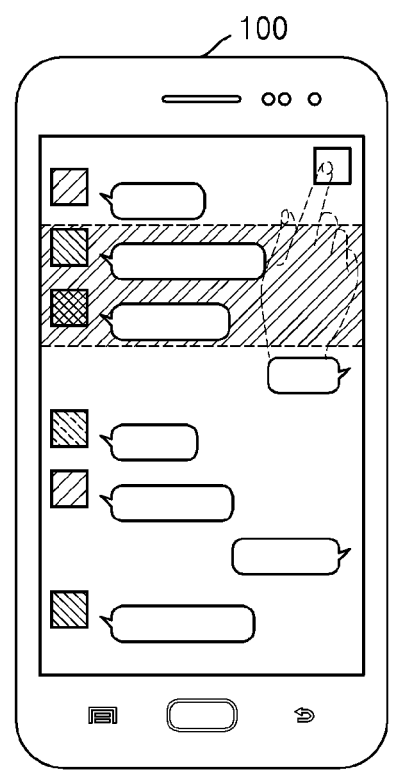
Figure 6C:
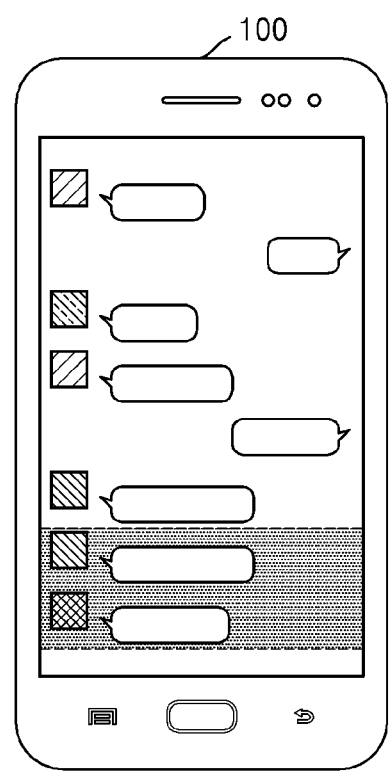

In addition, the first device 100 may display a UI indicating the completion of the edit mode on the display unit of the first device 100. For example, as illustrated in FIG. 6A, the first device 100 may detect a UI 158 indicating the completion of the edit mode on the display unit of the first device 100. At this time, the first device 100 may move the selected visual signs to given (or, alternatively, desired or predetermined) positions while receiving a user input of completing the edit mode. For example, when the first device 100 detects a touch of the UI 158 indicating the completion of the edit mode as illustrated in FIG. 6B, the first device 100 may move the selected visual signs to positions at which the most recently transmitted or received visual signs are displayed as illustrated in FIG. 6C. In this manner, the user may edit the order of conversations in the chat window so as to confirm the past transmitted or received content of conversations together with the recently transmitted or received content of conversations.

FIGS. 4 to 6 illustrate an example of editing the displayed content of conversations, and the first device 100 may edit the displayed content of conversations by using various methods.

Figure 7A:
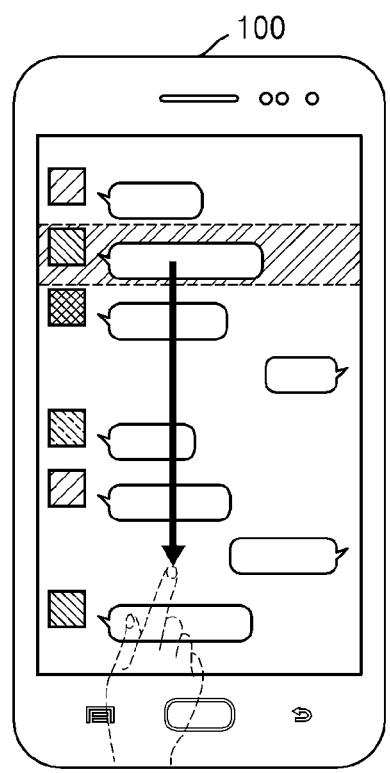
Figure 7B:
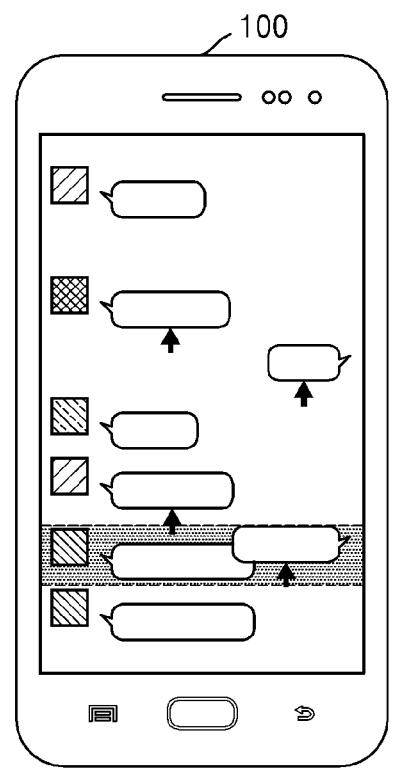
Figure 7C:
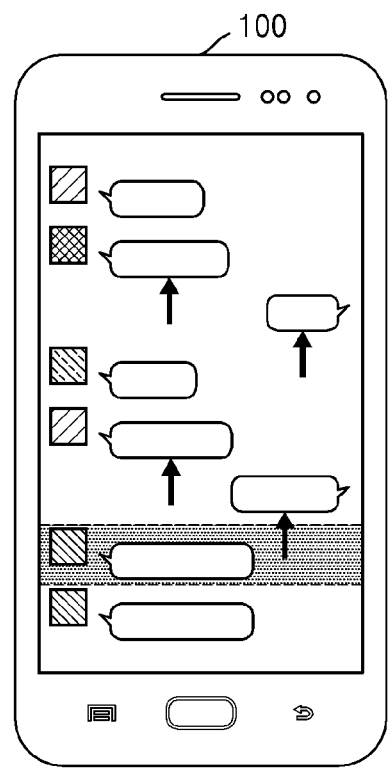

When the display order of the visual signs is edited by the chat service providing method according to an example embodiment, the intervals between the visual signs may be rearranged. For example, as illustrated in FIG. 7A, when the first device 100 receives a user input of moving a selected visual sign to a given (or, alternatively, desired or predetermined) position, the first device 100 may move the corresponding visual sign to the given (or, alternatively, desired or predetermined) position. At this time, the first device 100 may move visual signs, which are located in a first direction from at a moved position of the selected visual sign, in the first direction. For example, as illustrated in FIG. 7B, the first device 100 may move all visual signs, which are located between the original position of the selected visual sign and the moved position of the selected visual sign, in an upward direction. When the time has elapsed, as illustrated in FIG. 7C, the visual signs may be sufficiently moved and the intervals between the visual signs may be regularly rearranged. The first device 100 may display such a rearranging process through animations, or may immediately display a completely rearranged state without soft animations.

Figure 8A:
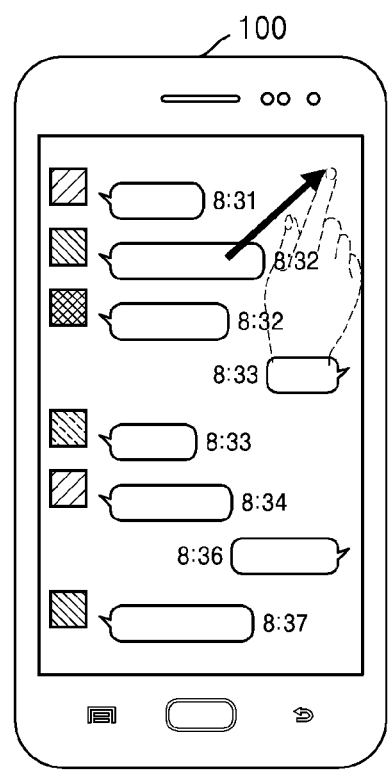
Figure 8B:
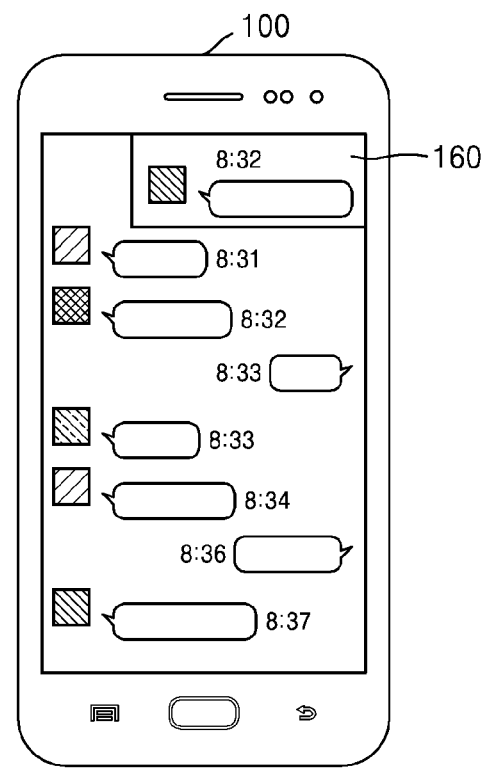
Figure 8C:
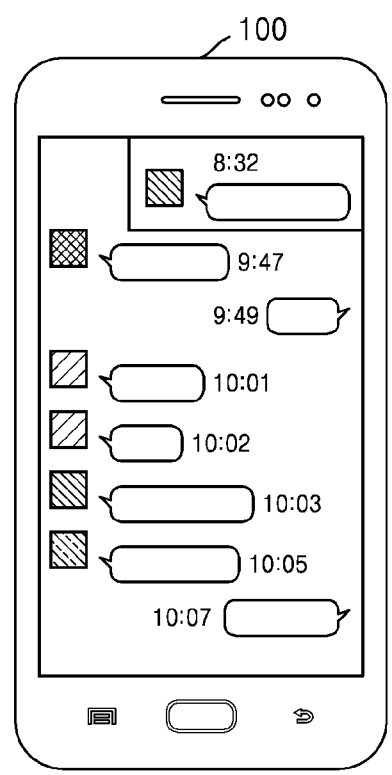

In addition, the first device 100 may receive a user input of moving some of visual signs to given (or, alternatively, desired or predetermined) positions. For example, as illustrated in FIG. 8A, the first device 100 may detect a user action of touching and dragging a specific visual sign to a given (or, alternatively, desired or predetermined) position. At this time, the first device 100 may fix the corresponding dragged visual sign to the corresponding given (or, alternatively, desired or predetermined) position. For example, as illustrated in FIG. 8B, the first device 100 may discriminate the corresponding given (or, alternatively, desired or predetermined) position 160 from regions where other visual signs are located, and fix the corresponding dragged visual sign to the corresponding given (or, alternatively, desired or predetermined) position 160. The fixed visual sign may be displayed at the corresponding given (or, alternatively, desired or predetermined) position 160 until the first device 100 releases the fixing. For example, as illustrated in FIG. 8C, even in a case where the transmission and reception times of the visual signs sequentially displayed according to the time is between 9:47 and 10:07, the first device 100 may always display a visual sign received at 8:32 at the fixed position. In this manner, the user may make the visual sign containing important information be always displayed on the chat window.

Figure 9:
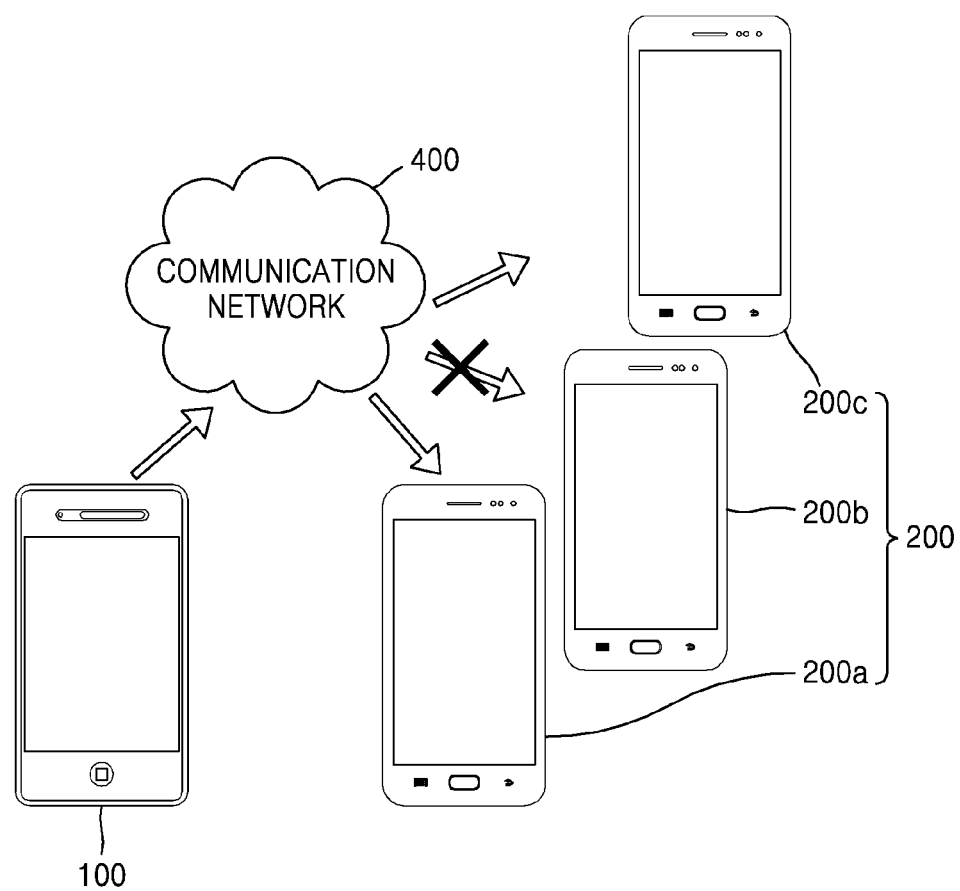
FIG. 9 is a diagram for describing a process of transmitting and receiving information generated during a chat service among a plurality of devices.

FIG. 9 is a diagram for describing an example process of transmitting and receiving information generated during the chat service among a plurality of devices.

Referring to FIG. 9, the method of providing a chat service, according to an example embodiment, may transmit edit information on edited visual signs to external devices. For example, as illustrated in FIG. 9, the first device 100 may transmit the edit information on the edited visual signs to the second devices 200 through the communication network 400. At this time, the first device 100 may transmit all or part of data about edited content of multilateral conversations to the communication network 400, or may transmit only data about a change matter indicating which visual signs are edited to the communication network 400. In this manner, the user may share the change matter of the visual signs edited by the user with other persons.

The first device 100 may transmit the edit information to only the second devices 200 selected by the user. For example, it may be considered a case where the first device 100 progresses conversation with three second devices 200a, 200b, and 200c through visual signs, and the user of the first device 100 permits the second device 200a and the second device 200c to transmit the corresponding edit information and does not permit the second device 200b to transmit the corresponding edit information. In this case, as illustrated in FIG. 9, the corresponding edit information, which is transmitted from the first device 100 to the communication network 400, may be transmitted to only the second device 200a and the second device 200c. In this manner, the user may share the change matter of the visual signs edited by the user with other persons desired by the user.

The first device 100 may transmit the corresponding edit information to only the second devices 200 having transmitted the edited visual signs among the entire visual signs. For example, it may be considered a case where the first device 100 progresses conversation with three second devices 200a, 200b, and 200c through visual signs, the visual signs edited by the first device 100 are visual signs transmitted from the second device 200a and the second device 200c, and the visual signs transmitted from the second device 200b are not edited. In this case, as illustrated in FIG. 9, the corresponding edit information, which is transmitted from the first device 100 to the communication network 400, may be transmitted to only the second device 200a and the second device 200c. In this manner, the user may share the changed matter of the visual signs edited by the user with other persons who has directly created the corresponding visual signs.

In addition, the second device 200a and the second device 200c may receive the edit information from the first device 100 only when the users of the second device 200a and the second device 200c permit the reception of the edit information from the first device 100. For example, it may be considered a case where the user of the second device 200a permits the reception of the edit information from the first device 100 and the user of the second device 200c does not permit the reception of the edit information from the first device 100. In this case, the second device 200a may receive the corresponding edit information. On the other hand, the second device 200c may not receive the corresponding edit information, or may not use the corresponding edit information even if receiving the corresponding edit information. In this manner, the user may be permitted to share the edit information by only other persons desired by the user.

In addition, the second device 200 may automatically change the order of the visual signs displayed thereon according to the information permitted to share from the first device 100, and may change the order of the visual signs displayed on the second device 200 only when the user of the second device 200 wants to change the order of the visual signs. When the order of the visual signs displayed on the second device 200 is changed, based on the information permitted to be shared by the user of the first device 100, the second device 200 may output the notification of the change in the order of the visual signs. The second device 200 may output the notification by using a method of displaying a specific UI, a method of outputting a specific sound through a speaker, or a method of generating a vibration. In this manner, when the order of the visual signs is changed without the user's direct involvement, the user may be notified of the changed matter.

The first device 100 or the second device 200 may generate an electronic file containing the content of conversations between the first device 100 and the second device 200. The first device 100 or the second device 200 may generate an electronic file containing the edited content of conversations. The first device 100 or the second device 200 may receive a user input of generating an electronic file. For example, the first device 100 may display a UI for storing the content of conversations on the display unit 120. The first device 100 may detect an action of selecting the corresponding UI. When the first device 100 detects the action of selecting the corresponding UI, the first device 100 may generate an electronic file containing the content of conversations.

According to one or more example embodiments, as described above, it is possible to edit content of conversations by editing the order of visual signs displayed during multilateral conversations through the visual signs or deleting some of the visual signs, and editing content of conversations according to the importance thereof.

In addition, it is possible to provide the chat service that is capable of notifying edited content of conversations to other persons by transmitting and receiving information on edited visual signs among a plurality of devices.

As discussed similarly above, one or more example embodiments set forth herein may be embodied as program instructions that can be executed by various computing devices, and recorded on a non-transitory computer-readable recording medium. Examples of computer-readable recording mediums include a magnetic medium (such as a hard disc, a floppy disk, and a magnetic tape), an optical medium (such as a compact disc (CD)-read-only memory (ROM) and a digital versatile memory (DVD)), a magneto-optical medium (such as a floptical disk), and a hardware device specially configured to store and execute program instructions (such as a ROM, a random access memory (RAM), and a flash memory).

The computer programs may be specifically designed and configured for inventive concepts, or may be well known to and usable by one of ordinary skill in the field of computer software. Examples of the computer programs include not only machine language codes prepared by a compiler but also high-level codes executable by a computer by using an interpreter.

Example embodiments set forth herein are merely examples and are not intended to limit the scope of inventive concepts. For clarity, other functional aspects of the existing electronic structures, control systems, software, and systems may not be described herein. Also, lines or connecting members that connect components illustrated in the drawings are merely used to represent functional connection and/or physical or circuit connections, and may be thus replaced with other elements or used to represent additional various other functional connections, physical connection, or circuit connections when inventive concepts is applied to an actual apparatus. Also, components illustrated in the drawings may be omitted unless they are particularly stated using expressions such as "necessary" or "important".

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope of inventive concepts as defined by the following claims.

What is claimed is:

1. A method of providing a chat service, the method comprising:
    sequentially displaying, on a display unit of a first device, a plurality of visual signs according to at least one of transmission and reception times of the plurality of visual signs, the plurality of visual signs being included in a conversation between the first device and a plurality of second devices, and being transmitted between the first device and the plurality of second devices;
    receiving an edit mode entry command to enter an edit mode in which the plurality of visual signs are editable;
    receiving a visual sign selection command selecting one or more of the plurality of visual signs;
    changing a display order of the plurality of visual signs by moving the selected one or more of the plurality of visual signs;
    fixing, relative to a screen of the display unit, the moved one or more of the plurality of visual signs to a position such that the fixed one or more of the plurality of visual signs do not move in response to sequential display of additional visual signs; and
    transmitting, after the changing, edit information indicating the movement and the fixing of the selected one or more of the plurality of visual signs to only a subset of the plurality of second devices, the subset including only second devices among the plurality of second devices that have transmitted at least one of the selected one or more of the plurality of visual signs.

2. The method of claim 1, wherein
    the display unit is a touch sensitive display unit; and
    the receiving the visual sign selection command includes
        detecting at least one of (i) a touch input at a position on the display unit corresponding to the one or more of the plurality of visual signs, and (ii) a dragging of the position corresponding to the one or more of the plurality of visual signs while holding the touch input.

3. The method of claim 2, wherein the selected one or more of the plurality of visual signs are moved to a position at which the touch input on the display unit is completed.

4. The method of claim 1, further comprising:
    displaying the selected one or more of the plurality of visual signs discriminatively from others of the plurality of visual signs based on the received visual sign selection command.

5. The method of claim 1, further comprising:
    displaying the moved one or more of the plurality of visual signs discriminatively from others of the plurality of visual signs.

6. The method of claim 1, further comprising:
    receiving an end command to end the edit mode after the receiving of the visual sign selection command.

7. The method of claim 6, wherein the changing comprises:
    moving the selected one or more of the plurality of visual signs to a position at which a most recently transmitted or received visual sign, from among the plurality of the visual signs, is displayed on the display unit in response to receiving the end command.

8. The method of claim 1, wherein the changing comprises:
    moving the selected one or more of the plurality of visual signs in a first direction; and moving, from among the plurality of visual signs, those visual signs located between an original position of the moved one or more of the plurality of visual signs and a moved position of the moved one or more of the plurality of visual signs in a second direction opposite to the first direction.

9. The method of claim 1, further comprising:
changing displayed content of the plurality of visual signs by deleting the selected one or more of the plurality of visual signs.

10. The method of claim 1, wherein the subset of the plurality of second devices is selected by a user of the first device from among the plurality of second devices.

11. The method of claim 1, further comprising:
receiving, from one or more of the plurality of second devices, information indicating that the display order of the plurality of visual signs has been changed at the one or more of the plurality of second devices,
wherein the changing includes changing the display order of the plurality of visual signs based on the received information.

12. The method of claim 11, wherein the changing comprises:
changing the display order of the plurality of visual signs based on the received information when the received information is information received from a second device, which is among the plurality of second devices, and which has been selected by a user of the first device.

13. The method of claim 11, further comprising:
outputting a notification on the display unit when the display order of the plurality of visual signs is changed based on the received information.

14. The method of claim 1, further comprising:
resetting the changed display order of the plurality of visual signs, the resetting including rearranging the plurality of visual signs according to the at least one of transmission and reception times of the plurality of visual signs.

15. The method of claim 1, further comprising:
storing, after the changing, edited content of conversations in an electronic file.

16. A non-transitory computer-readable recording medium having recorded thereon a program that, when executed by a computer, causes the computer to:
sequentially display, on a display unit of a first device, a plurality of visual signs according to at least one of transmission and reception times of the plurality of visual signs, the plurality of visual signs being included in a conversation between the first device and a plurality of second devices, and being transmitted between the first device and the plurality of second devices;
receive an edit mode entry command to enter an edit mode in which the plurality of visual signs are editable;
receive a visual sign selection command selecting one or more of the plurality of visual signs;
change a display order of the plurality of visual signs by moving the selected one or more of the plurality of visual signs;
fix, relative to a screen of the display unit, the moved one or more of the plurality of visual signs to a position such that the fixed one or more of the plurality of visual signs do not move in response to sequential display of additional visual signs; and
transmit, after the display order is changed, edit information indicating the movement and fixing of the selected one or more of the plurality of visual signs to only a subset of the plurality of second devices, the subset including only second devices among the plurality of second devices that have transmitted at least one of the selected one or more of the plurality of visual signs.

17. A device for providing a chat service, the device comprising:
a memory having computer-readable instructions stored therein; and
at least one processor configured to execute the computer-readable instructions to
transmit and receive a plurality of visual signs to and from a plurality of external devices,
sequentially display the plurality of visual signs on a display unit according to at least one of transmission and reception times of the plurality of visual signs,
receive an edit mode entry command to enter an edit mode in which the plurality of visual signs are editable,
receive a visual sign selection command selecting one or more of the plurality of visual signs,
change a display order of the plurality of visual signs by moving the selected one or more of the plurality of visual signs,
fix, relative to a screen of the display unit, the moved one or more of the plurality of visual signs to a position such that the fixed one or more of the plurality of visual signs do not move in response to sequential display of additional visual signs; and
transmit, after changing the display order, edit information indicating the movement and fixing of the selected one or more of the plurality of visual signs to only a subset of the plurality of external devices, the subset including only external devices among the plurality of external devices that have transmitted at least one of the selected one or more of the plurality of visual signs.

* * * * *